United States Patent
Raskar et al.

(10) Patent No.: US 7,292,269 B2
(45) Date of Patent: Nov. 6, 2007

(54) CONTEXT AWARE PROJECTOR

(75) Inventors: Ramesh Raskar, Cambridge, MA (US); Clifton L. Forlines, Cambridge, MA (US); Paul A. Beardsley, Boston, MA (US)

(73) Assignee: Mitsubishi Electric Research Laboratories, Cambridge, MA (US)

( * ) Notice: Subject to any disclaimer, the term of this patent is extended or adjusted under 35 U.S.C. 154(b) by 811 days.

(21) Appl. No.: 10/412,178

(22) Filed: Apr. 11, 2003

(65) Prior Publication Data

US 2004/0201823 A1    Oct. 14, 2004

(51) Int. Cl.
G03B 21/56 (2006.01)
(52) U.S. Cl. .............. 348/207.99; 348/169; 353/28
(58) Field of Classification Search ............ 348/333.1, 348/744, 135, 136, 137, 69, 76, 104, 51, 348/47; 353/69, 104, 76
See application file for complete search history.

(56) References Cited

U.S. PATENT DOCUMENTS

| | | | |
|---|---|---|---|
| 4,978,216 A * | 12/1990 | Liljegren et al. | ............. 353/28 |
| 6,191,812 B1 * | 2/2001 | Tzidon et al. | ............. 348/140 |
| 6,437,820 B1 * | 8/2002 | Josefsson | ............. 348/169 |
| 6,554,431 B1 * | 4/2003 | Binsted et al. | ............. 353/28 |
| 6,697,761 B2 * | 2/2004 | Akatsuka et al. | ........... 702/151 |
| 7,075,587 B2 * | 7/2006 | Lee | ............................ 348/563 |

OTHER PUBLICATIONS

Underkoffler et al. "*Emancipated pixels: Real-world graphics in the luminouse room*," SIGGRAPH '99, pp. 385-392, 1999.

* cited by examiner

*Primary Examiner*—David Ometz
*Assistant Examiner*—Pritham D. Prabhakher
(74) *Attorney, Agent, or Firm*—Dirk Brinkmen; Clifton D. Mueller; Gene V. Vihokur

(57) ABSTRACT

A method displays an output image on an object. A set of unique markers are fixed to the object at predetermined locations. An input image of the object and the markers is acquired with a camera in a fixed physical relationship to a projector. A pose of the projector with respect to the markers is determined from the image. Then, one or more output images related to the object can be projected onto the object, at predetermine locations, according to the pose of the projector and the unique markers.

18 Claims, 3 Drawing Sheets

300

CONTEXT AWARE PROJECTOR

FIELDS OF THE INVENTION

This invention relates generally to digital projectors, and more particularly to a projectors used for augmented reality.

BACKGROUND OF THE INVENTION

The field of augmented reality is concerned with enhancing what we see and hear around us in the physical world. Researchers in this field superimpose computer graphics onto our view of real world objects. This enhances both our perceptions and our interactions with the real world. It enables improved performance of real world tasks.

There are multiple methods for achieving augmented reality. One method of providing an augmented view of the world is through the use of an LCD-screen based personal digital assistant (PDA). That technique has some drawbacks. The physical size of a PDA limits the information that can be presented to the user, regardless of future improvements in pixel resolution. The information displayed on a PDA is in the coordinate frame of the camera, not the user's own viewpoint. Use of a PDA requires the user to context-switch between the physical environment and the display. A PDA must be kept either on the user's person or nearby, but easily visible. A PDA only provides augmentation to an individual, or at best a small group of people clustered around a very small device.

Another method of providing an augmented view of the world is through the use of 'see-through' video micro-display eyeglasses. A drawback is that the tight coupling between the user's eyes coordinate frame and the displayed image coordinate frame requires very accurate processing of user head motion, e.g., a user head rotation must be accurately matched by a complementary rotation in the displayed image. Also, video micro-display eyeglasses are for individual use only, not shared use. Because the display is only a centimeter or so from the eye, working with an augmented object is awkward because other objects, such as the user's hands, can easily occlude the augmentation. Finally, fatigue factors of eye-worn displays are well known.

Projector-based augmented reality projects augmentation directly onto the physical scene. It decouples the user coordinate frame from the relationship between the projector and the physical object. One advantage of this is that there is no need for the difficult task of determining user head motion when showing projected information.

A rotating movie camera has been used to acquire a film of a living room, replete with furniture, and people. The room and furniture were then painted a neutral white, and the film was projected back onto the walls and furniture using a rotating projector that was precisely registered with the original camera, see Naimark, "Displacements," Exhibit at the San Francisco Museum of Modern Art, San Francisco, Calif. 1984. This crucial co-location of the acquiring camera and displaying projector is common to most systems that use pre-recorded images, or image sequences to illuminate physical objects.

A projector and fiber-optic bundle have been used to animate the head of a fictional fortuneteller inside a real crystal ball, see U.S. Pat. No. 4,978,216 "Figure with back projected image using fiber optics" issued to Liljegren, et al., Dec. 18, 1990. Slides of modified photographs augmented with fine details have been used with very bright projectors to render imagery on a very large architectural scale. A well-known modem realization of this idea is Le Son et Lumière on Chateau de Blois in the Loire Valley of France. In addition, this medium is now being used elsewhere around the world to illuminate large-scale structures such as bridges.

The "Luminous Room" project treats a co-located camera-projector pair as an I/O bulb to sense and project imagery onto flat surfaces in the real physical surroundings of a room or a designated workspace, see Underkoffler et al. "*Emancipated pixels: Real-world graphics in the luminous room,*" SIGGRAPH '99, pp. 385-392, 1999. Their main focus is interaction with the information via luminous and tangible interfaces. They recognized co-planar 2D physical objects, tracked the 2D positions and orientations in the plane, and projected light from overhead to reproduce the appropriate sunlight shadows.

All those systems render compelling visualizations. However, cumbersome alignment processes can take several hours, even for a single projector. Many similar systems are based on the notion of one or more environmental sensors assisting a processor, which can compute the Euclidean or affine relationships between projectors and displays. Without the centralized sensors, the projectors are unable to augment the target objects. Those systems require a fixed special relationship between the projectors and the augmented objects. Any movement of either part requires the system to be recalibrated. Furthermore, the fixed nature of the projectors in those systems dictates that only certain parts of the objects can be augmented.

Therefore, it is desired to provide a context aware projector that does not have the limitations and problems of the prior art systems.

SUMMARY OF THE INVENTION

The invention provides a method for uniquely identifying a target object. Furthermore, the invention provides a method for determining the physical relationship between a projector and the object. Knowing the unique identification of the object and the relative position of the projector and the object enables the projection of calibrated images that are related to the object.

The invention can be applied to a variety of systems where it is desirable to augment an object with projected images that are specific to that object. Examples include information displays on objects, e.g., information displays for a printer include the print queue or the expected time for jobs to complete. Information displays for books could include comments that appear in the margin. Training applications in which instructions are displayed on a known object. Physical indexing in which a user is guided towards a requested object, e.g., by projected arrows on the ground and by highlighting of specific areas in a storage area or workspace. Recovery and projection of electronic data items which have been attached to the environment. A 'Magic Lens' to simulate transparency of an opaque surface. Projection of language specific information about an object of interest to a tourist.

The invention further provides means for adapting the projected content according to several factors, including the history of interaction, the position and motion of the projector, and the presence of other similar devices.

DETAILED DESCRIPTION OF THE PREFERRED EMBODIMENT

Geometrically Aware Projector

Figure 1:
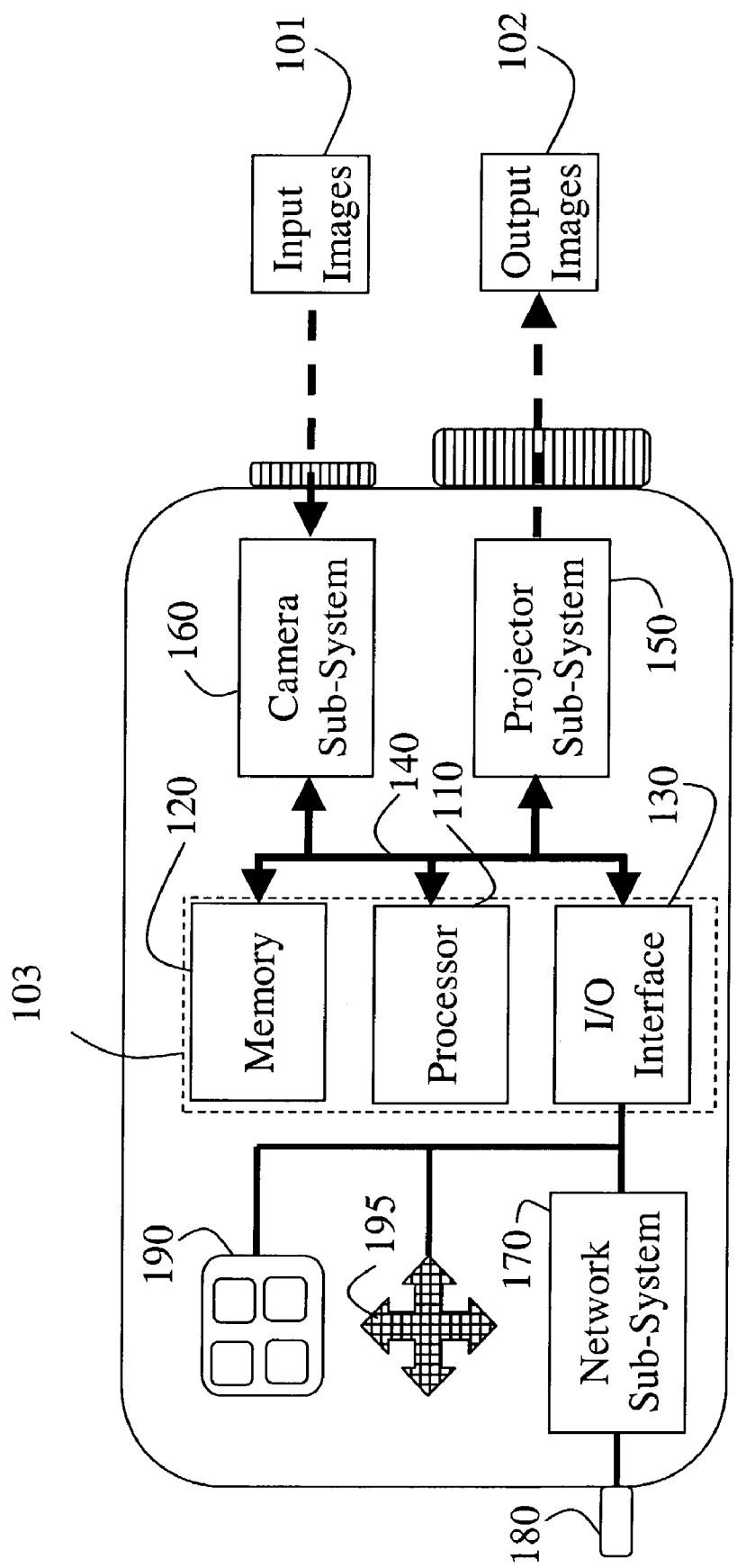
FIG. 1 is a block diagram of a projector according to the invention.

FIG. 1 shows a context aware projector 100 according to our invention. It should be noted that the projector 100 can be used alone or in a cooperative combination with other similar projectors.

Our projector 100 includes a microprocessor 110, a memory 120, and an I/O interface 130 connected by buses 140, generally a processing unit 103. The processing unit is conventional in its electronic structure, but unconventional in its operation when performing the method steps described herein.

The projector also includes a projector sub-system 150 for displaying output images 102, and a camera sub-system 160 for acquiring input images 101 of a scene including uniquely identified objects.

A network sub-system 170 allows the projector to communicate with other similar devices, or other computing devices, local or remote. Therefore, the network system can be connected to an antenna or infrared transceiver 180, depending on the communications medium.

A user interface 190 can provide input and output data to facilitate operation of the projector. For instance, the interface can include left, center, and right buttons as are normally found on an input mouse. The interface can also include a "scroll" wheel, as are known in the art.

Internal sensors 195, e.g., tilt sensors or accelerometers can determine an orientation of the projector. It should be noted that the sensors are internal only, and do not sense the environment external to the projector. It should be noted that the sensors are optimal.

Projector Operation

The projector 100 can perform a number of functions, including smart keystone correction, orientation compensated image intensities, auto brightness, zoom and focus, 3D scanning for geometry and texture capture, and smart flash for the camera sub-system 160. For this last function, the projector function is secondary to the camera function. Here, the projector merely illuminates specific areas in a scene observed by the camera. A number of additional adaptive functions are described in greater detail below.

System Structure and Method

Figure 2:
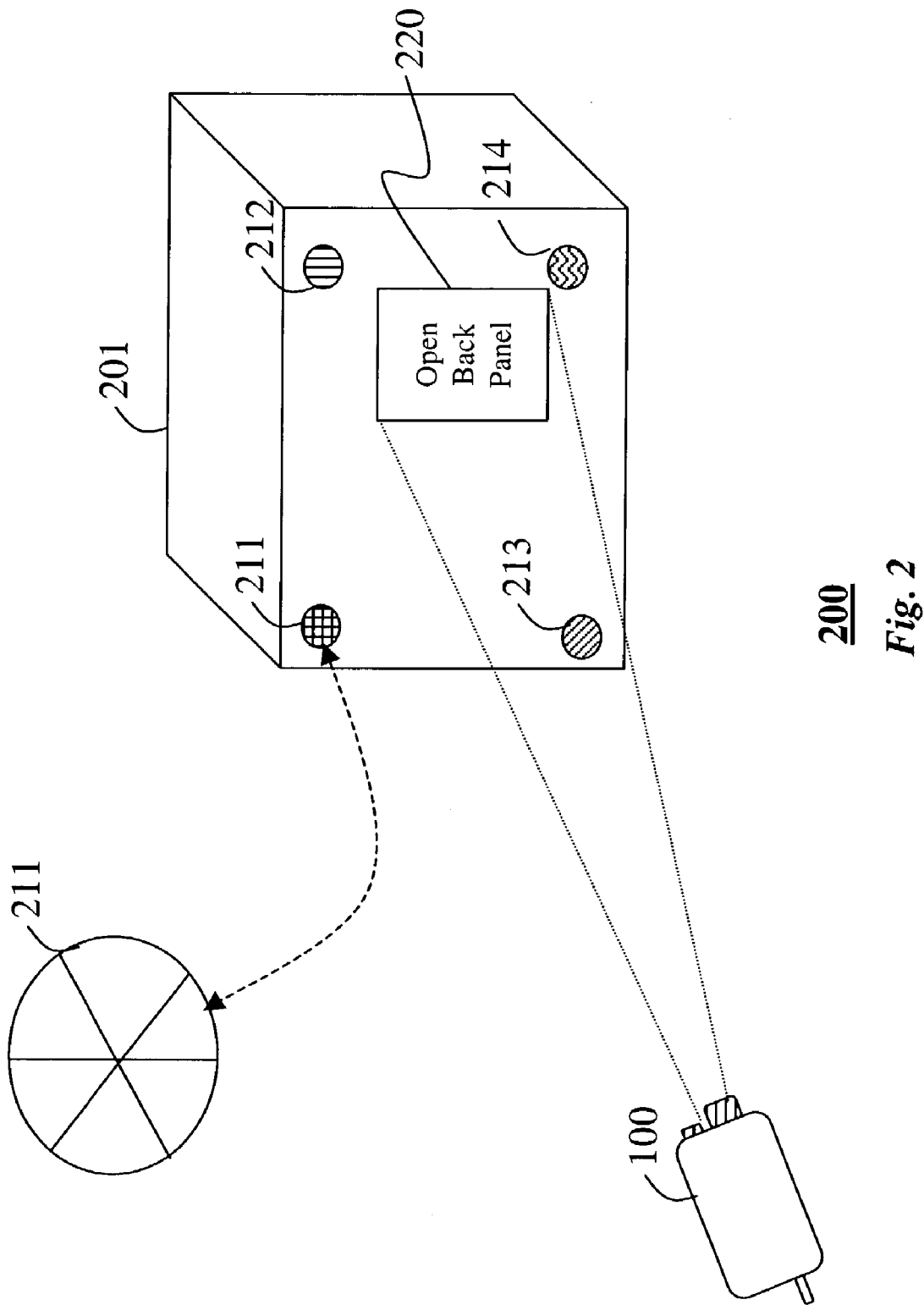
FIG. 2 is a block diagram of an object augmented by an image displayed by the projector of FIG. 1.

As shown in FIG. 2, we use our calibrated projector-camera system 200 for uniquely identifying an object 201, and projecting object specific information 220. A relative position of the object with respect to the projector 100 is determined from unique visual markers 211-214 attached to the object 201. By pose, we mean the (x,y,z) position of the projector in the same coordinate frame of the object, and the orientation of the projector. By orientation we mean the amount of rotation about any of the three major axes.

In the preferred embodiment, the markers are circular, see enlargement, with multiple colored segments, e.g. four to six. The pattern of the colors define different unique identifications, see U.S. patent application Ser. No. 09/628,461, "Badge Identification System," filed Jul. 31, 2000, incorporated herein by reference.

The color-coding encodes a unique identity. It should be noted that other similar markers can be used. One or more markers can be used as described below in detail.

Four or more points on the object 201 are used to obtain a unique solution of camera pose with the calibrated camera sub-system 160. The points are obtained from images acquired at a long range of the multiple markers, or from the shape of a single marker at closer-range.

After the camera pose is determined, the projector pose is known via the system calibration. After the position and orientation of the projector are known, augmentation information retrieved from the memory 120 or downloaded via the network 210 can then be displayed. The shape, size, and location where the image is displayed can be predetermined.

Important applications where context-based augmentation can be used include: information displays on objects, either passive display, or training applications in which instructions 220 are displayed as part of a sequence of steps; physical indexing where a user is guided towards a requested object; identifying the presence of, and projecting, electronic data items which have been attached to the environment.

Context-based augmentation does not have rigorous requirements for accuracy because small offsets in positioning of augmented information are usually not of consequence. It does, however, put more emphasis on modes of use. For example, distance from an object can be used to adjust level-of-detail in the projected augmentation 220.

The system is calibrated so that the following information is known—the intrinsic parameters of the projector, the intrinsic parameters of the camera, the relative position and orientation between the projector and camera. This calibration can be done as a pre-calibration step before the system is in operation, or can be done as start-up processing when the system begins operation. Any of the well-known camera calibration techniques can be used.

The purpose of the camera is to acquire the pose of the system relative to a surface of interest in the scene. Here 'pose' is used to mean the (x, y, z) location, and orientation. This is achieved by processing an input image of the object to determine the pose of the camera, then using the calibration information to infer the pose of the projector. After the pose of the projector is known, the augmentation information 220 can be projected to a desired place on the surface of interest.

Figure 3:
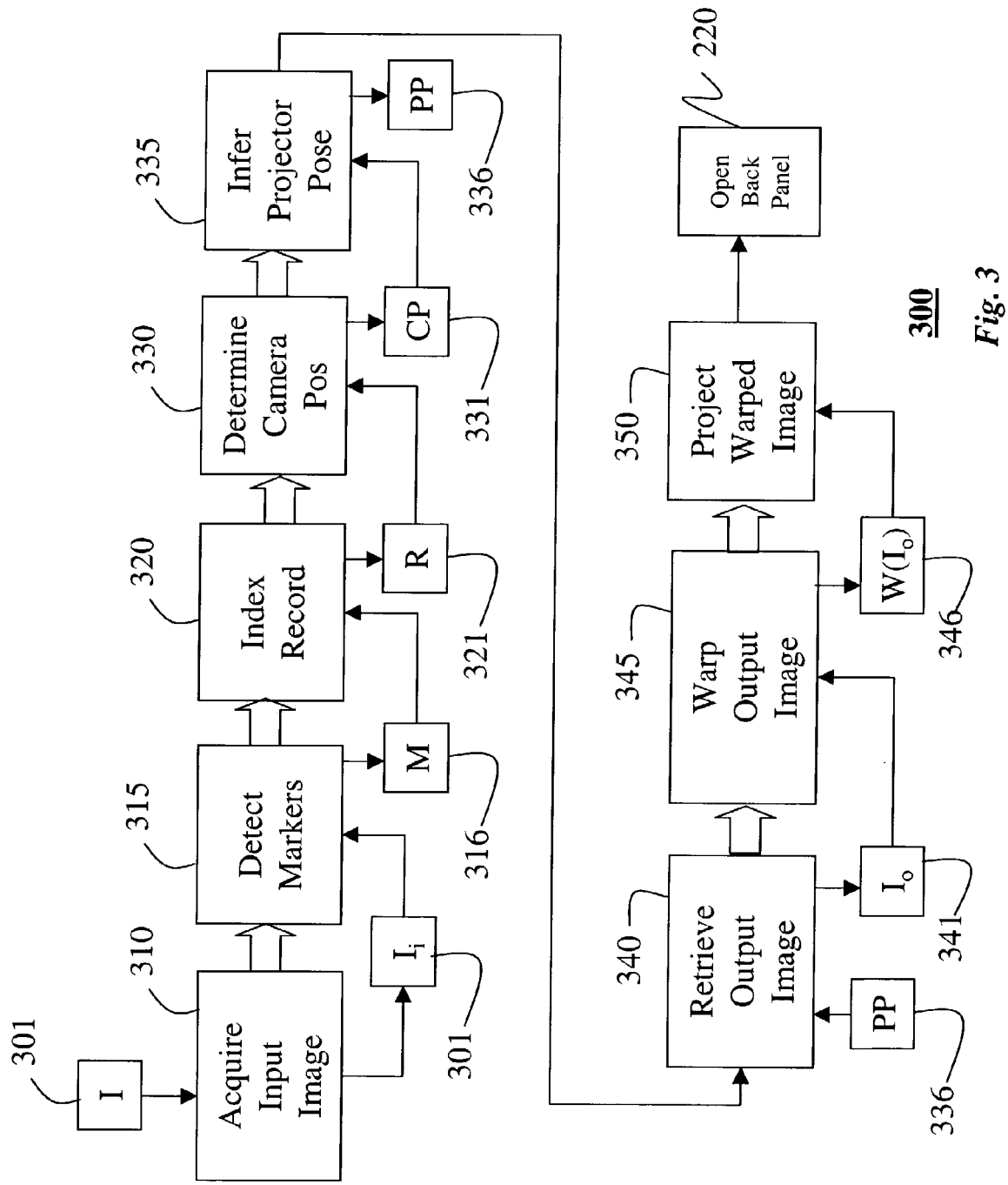
FIG. 3 is a block diagram of a method for displaying images on an object according to the invention.

As shown in FIG. 3, our method 300 first acquires 310 an input image ($I_i$) 301 of a scene. The scene includes at least four visual markers. These visual markers are color-coded, and the color-coding specifies identity. The markers can be thought of as analogous to barcodes, but based on color rather than striping.

Next, the markers 316 are detected 315 in the input image 301. The markers are used to index 320 a database record (R) 321, stored perhaps in the memory, 120, or some other memory accessible via the network 170.

The record includes positional information for the markers in an appropriate coordinate frame, e.g., the coordinate frame of the surface of interest to which it is attached. The positional information includes the (x, y, z) position of the markers in the real world as well as their appearance and geometry, e.g., color, shape and size.

The positional information of the record 321 is used to determine 330 a pose (CP) 331 of the camera with respect to the markers, and hence with respect to the surface of interest. The camera pose is used to infer 335 a pose (PP) 336 of the projector. This calculation is performed using known homographies, a well-known image processing technique.

Next, an output image ($I_o$) 341 is retrieved 340 from the memory. The output image can be stored in the record 321, or elsewhere. The specific image retrieved can depend on the unique identification, history of interaction, the position and motion of the projector, and the presence of other similar devices.

The output image is then warped 345 according to the projector position and orientation. The method 300 then projects 350 the warped image 346 to display the information 220. The warping adjusts the pixels in the output image so that they appear vertically and horizontally aligned with the coordinate frame of the scene, for an arbitrary pose of the projector 100. The result is an undistorted appearance of the displayed information on surface of the physical object. The means of warping the content are described in detail in U.S. patent application Ser. No. 08/930,426 "Simulating Motion of Static Objects in Scenes", filed Aug. 14, 2001, incorporated herein by reference.

History of Augmentation

We provide a variant of the basic mode that takes advantage of the history of augmentation. In step 320, the database can record that a particular record was accessed. Then, in step 340, the database can return alternative content based not only on the identity of the markers being viewed but also on the number of times the markers were been viewed in the past.

Alternative to Using Four Markers

We provide an alternative to the basic mode of operation that relies on fewer visual markers being visible on the target. In step 315 of the basic mode of operation, the method detects four markers because the homography used to determine the pose of the camera relies on four known points. This step uses the center of each marker as a known point. Because the record for each marker stores not only the (x, y, z) position of its center, but also its radius, a single marker can provide multiple known points. Using this extra geometric information, the method needs to only correctly detect and identify at least one marker in step 315.

Alternative to Visible Markers

We provide an alternative to the basic mode of operation that removes the appearance of the visual markers. The visual markers can be made to be invisible to the human eye by negating them in the output image according to the description in the record 321, or their appearance in the input image.

Alternative Content Based on Projector Position

We provide a variant of the basic mode of operation that takes further advantage of the position of the projector relative to the object being augmented. In the basic mode of operation, in step 345, the pose of the projector is used to warp the content being projected. We can also use the pose to retrieve pose specific content from the database.

One example use of this variant projects high-level semantic information when the user is far away from an augmented object, and then to project low-level detailed information when the user is close to the same object.

Alternative Content Based on Projector Motion

We provide a variant of the basic mode of operation that takes advantage of the motion of the projector. During step 335, in which the position of the projector is determined, we can record this position in a database. Then, in step 340, when we retrieve content from the database, we can retrieve content based on the motion of the projector by examining the history of previous positions of the projector.

One example use of this variant projects low detailed images when the user moves quickly to move the projected image across an object, and high-detailed images when the user is moving slowly, or standing still.

Alternative Content Based on the Presence of Similar Devices

We provide a variant of the basic mode of operation that takes advantage of the presence of similar devices. In step 340, when we retrieve content from the database, the database can record that the content is being accessed and can record the identification of the device accessing the record. If multiple devices are accessing a record, then the content can be altered based on this knowledge.

One example use of this variant repositions the content on the surface of an object so that the images projected from multiple devices do not overlap and obscure one another. If multiple people are projecting a list of their queued print jobs on the surface of a printer, the devices are able to reposition these lists so that they do not overlap one another.

Alternative Content Based on the Time of Projection

The content retrieved from the database in step can also be affected by the time of retrieval.

Alternative to Image Projection

We also provide a variant of the basic mode of operation that warps and projects video content instead of still images.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for displaying an output image on an object, comprising:
    fixing a set of unique markers to the object at predetermined locations;
    acquiring an input image of the object and the set of unique markers with a camera in a fixed physical relationship to a projector;
    retrieving an output image based on the set of unique markers in the input image;
    determining a pose of the projector with respect to the set of unique markers in the input image;
    projecting the retrieved output image onto the object according to the pose of the projector and the set of unique markers; and
    negating an appearance of the set of unique markers in the output image to make the set of markers invisible.

2. The method of claim 1 wherein each unique marker in the set is circular with a plurality of different colored segments.

3. The method of claim 1 wherein there are four unique markers in the set.

4. The method claim 1 wherein a geometry of the unique markers is predetermined, and the set includes only one unique marker.

5. The method of claim 1 wherein a geometry of each unique marker is predetermined, and a location of each unique marker on the object is predetermined.

6. The method of claim 5 further comprising:
    storing the geometry and the location in a memory accessible by the projector.

7. The method of claim 1 wherein the pose includes a location and orientation of the projector.

8. The method of claim of claim 1 further comprising:
    warping the output image according to the pose of the projector prior to projecting the output image.

9. The method of claim 1 wherein the output image is dependent on a history of interaction between the projector and the object.

10. The method of claim 1 wherein the output image is dependent on the pose of the projector.

11. The method of claim 8 wherein the warping horizontally and vertically aligns the output image to a coordinate frame of the object.

12. The method of claim 1 further comprising:
determining a motion of the projector from the pose; and
selecting the output image dependent on the motion.

13. The method of claim 1 further comprising: selecting the output image based on a time of projection.

14. The method of claim 1 further comprising:
projecting a sequence of images.

15. The method of claim 1 wherein the output image is dependent on the co-presence of similar devices.

16. The method of claim 1 wherein the output image has a predetermined shape and is projected at a predetermined location on the object.

17. The method of claim 1 wherein the output image is retrieved from a memory.

18. The method of claim 1 wherein the output image is retrieved from a network.

* * * * *